(12) United States Patent
Rebordosa et al.

(10) Patent No.: US 7,398,725 B2
(45) Date of Patent: Jul. 15, 2008

(54) METERING POWDERY, FLAKY OR FINE-GRAINED DOSING MATERIAL

(75) Inventors: Antonio Rebordosa, Sant Fruitos de Bages(Barcelona) (ES); Guillermo San Roman, Barcelona (ES); Jorge Sanjuan, Barcelona (ES)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 11/437,290

(22) Filed: May 19, 2006

(65) Prior Publication Data

US 2006/0261095 A1 Nov. 23, 2006

Related U.S. Application Data

(63) Continuation of application No. PCT/EP2004/011841, filed on Oct. 20, 2004.

(30) Foreign Application Priority Data

Nov. 19, 2003 (DE) .................. 103 54 003

(51) Int. Cl.
*A47J 31/00* (2006.01)
*G01F 11/00* (2006.01)
(52) U.S. Cl. ..................... 99/289 R; 222/361
(58) Field of Classification Search ............. 99/289 R, 99/289 P, 289 D; 222/361, 388, 234
See application file for complete search history.

(56) References Cited

U.S. PATENT DOCUMENTS

| 2,755,000 | A | | 7/1956 | Parre |
| 3,759,162 | A | * | 9/1973 | Maxwell ................ 99/289 R |
| 4,366,920 | A | | 1/1983 | Greenfield et al. |
| 4,964,546 | A | * | 10/1990 | Morrow et al. ............ 222/352 |
| 5,680,809 | A | * | 10/1997 | Dings et al. ............. 99/289 D |
| 5,722,313 | A | * | 3/1998 | Schmed ................ 99/289 R |
| 5,803,673 | A | | 9/1998 | Reinsch |
| 5,816,455 | A | * | 10/1998 | Alpers et al. ............. 222/388 |
| 6,988,444 | B1 | * | 1/2006 | Pfeifer et al. .............. 99/286 |

FOREIGN PATENT DOCUMENTS

| DE | 38 10 143 | 5/1989 |
| DE | 198 32 413 | 1/2000 |
| GB | 678872 | 9/1952 |

* cited by examiner

*Primary Examiner*—Reginald L Alexander
(74) *Attorney, Agent, or Firm*—Fish & Richardson P.C.

(57) ABSTRACT

Metering Powdery or Flaky or Fine-Grained Dosing Material, such as Coffee Powder, Milk Powder or Cocoa Powder by use of a metering device having a container for accommodating the dosing material, and a metering chamber for metering one portion of the dosing material arranged at the outlet of the container. The dosing material is discharged into a collecting receptacle via a discharge port each time an actuating element is actuated. The dosing material is acted upon by an air current generated by a blower during its metered discharge.

12 Claims, 1 Drawing Sheet

METERING POWDERY, FLAKY OR FINE-GRAINED DOSING MATERIAL

CROSS REFERENCE TO RELATED APPLICATIONS

This application is a continuation of PCT application serial number PCT/EP2004/011841, filed Oct. 20, 2004, which claims priority under 35 U.S.C. §119(a) from German application serial number DE 103 54 003.2, filed Nov. 19, 2003, the entire contents of both of which are hereby incorporated by reference.

TECHNICAL FIELD

This disclosure relates to metering powdery or flaky or fine-grained dosing material, such as coffee powder, milk powder, or cocoa powder.

BACKGROUND

Patent No. DE 38 10 143 C1, discloses a coffee machine with a metering device. The metering device has an actuating element in the form of a screw conveyor that is positioned at the outlet of a container filled with dosing material. The revolutions of the screw conveyor determine whether more or less dosing material is discharged at a discharge port into a funnel situated under the discharge port. In this metering device, the funnel is located in direct contact with the brewing chamber. When the coffee machine is used several times in succession, hot steam originating from the brewing chamber can rise and moisten the discharge port of the metering device during the time period when the funnel is opened toward the brewing chamber to introduce the dosing material.

After a period of time, this process can lead to an accumulation of moisture on the discharge port. As a result, the dosing material being discharged adheres to this moisture on the discharge port. As the quantity of dosing material accumulating on discharge port increases over time, the discharge port becomes increasingly constricted. Ultimately, this can result in the discharge port becoming completely clogged, which results in the complete failure of the metering device.

Additionally, the dosing material adhering to the discharge port is constantly moistened by the rising steam. This can result in the dosing material caking and even turning moldy or growing harmful bacteria after extended use. This may lead to the metering device rendering the coffee inconsumable.

SUMMARY

In one aspect of the invention, a blower positioned on a metering device generates an air current that acts upon, and transports the dosing material discharged into a collecting receptacle. In some implementations, the collecting receptacle can be an intermediate container that lies adjacent to a brewing chamber for brewing a beverage. In other implementations the collecting receptacle can be the actual brewing chamber, in which the dosing material is brewed, of a machine for preparing beverages.

The air current being generated now makes it possible to position the collecting receptacle or brewing chamber so far from the metering device that rising steam originating from the brewing chamber is no longer able to reach the metering device. If the brewing chamber still needs to be arranged directly underneath the metering device, the air current prevents the rising steam from reaching the metering device. Preferably, the outlet remains dry and no powder is able to adhere to the outlet. This can prevent the metering device from clogging, and the dosing material from being contaminated, for example, by mold or bacteria.

In some embodiments, the air current is directed in the same direction as the direction that the dosing material is discharged, i.e., away from the discharge port. However, the air current may also be directed transverse to the direction in which the dosing material is discharged. As a result, the dosing material is deflected and subsequently delivered into the collecting receptacle in an equally directional fashion.

The intensity of the air current can be maintained in a relatively low range due to the directed transport in the defined channel. This can be achieved with a channel that surrounds the discharge port, and into which the air current is introduced at the discharge port. The air current may be directed essentially parallel to the channel, but may also be introduced into the channel transverse to, and in the longitudinal direction thereof via several jets in order to generate turbulences. Thus, ensuring that the entire dosing material can be acted upon and transported to the collecting receptacle.

In some embodiments, individual jet pipes are provided that lead into the channel radially outside the discharge port, and extend in the direction of the channel outlet in the interior of the channel, i.e., essentially parallel thereto. In other embodiments the inlet of the channel can have a cross section in the form of the ring channel that is arranged outside of, and surrounds the wall of the discharge port. In this embodiment, the coherent air current being annularly introduced into the channel is directed either parallel to the channel or slightly inward toward the center of the channel such that it can act upon and transport the entire dosing material to the channel outlet.

In some cases, an exactly metered quantity of the dosing material is discharged per piston stroke at the discharge port. This means that a certain metered quantity of powder can be discharged with each piston stroke. The small metered quantity discharged per stroke makes it possible to adjust the strength of a brewed beverage because one to three piston strokes can be carried out in order to brew a weaker beverage, while four to seven piston strokes can be carried out in order to brew a stronger beverage from the four to seven small quantities of the dosing material that are discharged. The size of the metering chamber can be chosen such that the metered quantity per piston stroke amounts to approximately 0.1 g, i.e., if approximately 2 g are required for preparing one cup of medium-strength instant coffee, the piston needs to carry out twenty strokes within a short period of time. During the proposed movement achieved by means of magnetic forces, the piston forms the magnet core and the coil forms the magnetic field for moving the piston into the coil. This can take place within such short intervals that only a few seconds are required for twenty strokes. If the coil is designed for moving the piston in one direction only, a spring needs to be provided in order to ensure that the piston is always returned into its initial position. However, the coil and the piston may also be adapted to one another in such a way that the coil moves the piston in one direction as well as in the opposite direction.

The air current can be generated by an electrically driven fan wheel, wherein the fan wheel may consist of a radial-flow as well as an axial-flow wheel. In order to make it possible to utilize a fan wheel with particularly small dimensions, the electric motor needs to have a relatively high speed, for example, of 8.000 to 20.000 rpm.

The collecting receptacle can either form the brewing chamber or a funnel that is directed toward the brewing chamber. Due to the generation of an air current in a machine, which is used for preparing beverages and which is suitable for household use, the brewing chamber can be arranged directly underneath the discharge port, if the air current prevents the steam originating from the brewing chamber from reaching the discharge port. However, in some embodiments, brewing chamber can be positioned laterally adjacent to the discharge port or even above the discharge port, in which case it is necessary to provide a channel for delivering the dosing material to the brewing chamber.

Other aspects, features, and advantages will be apparent from the following detailed description, the drawings and the claims.

DETAILED DESCRIPTION

Figure 1:
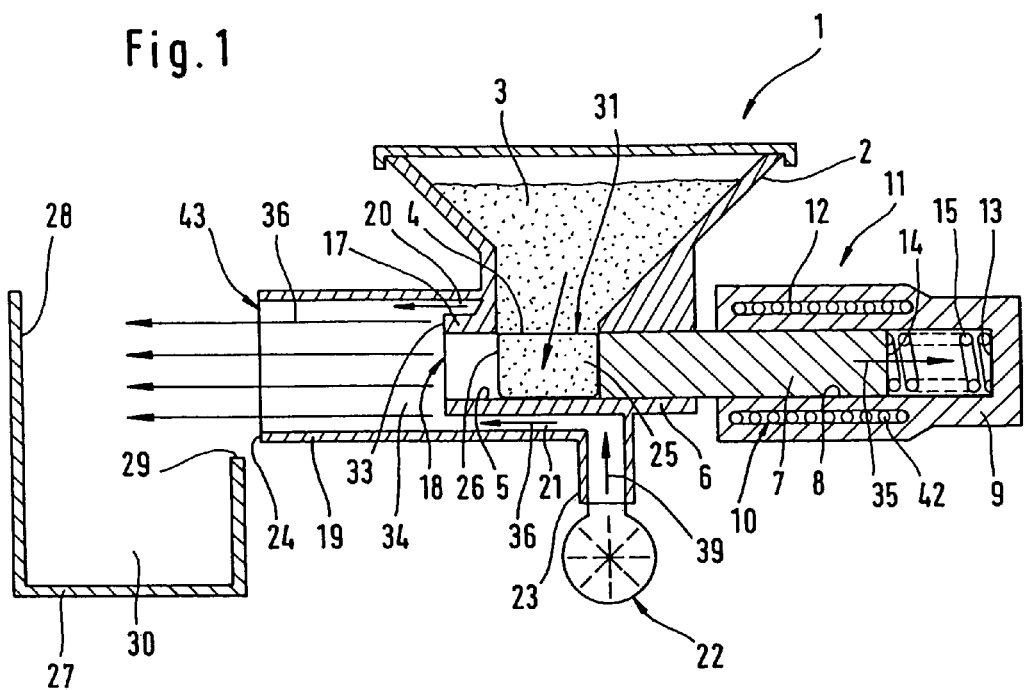
FIG. 1 shows a metering device with a piston in a position where the outlet of the metering chamber is open, such that the dosing material is able to drop into the metering chamber, i.e., the actuated state of the metering device.
Figure 2:
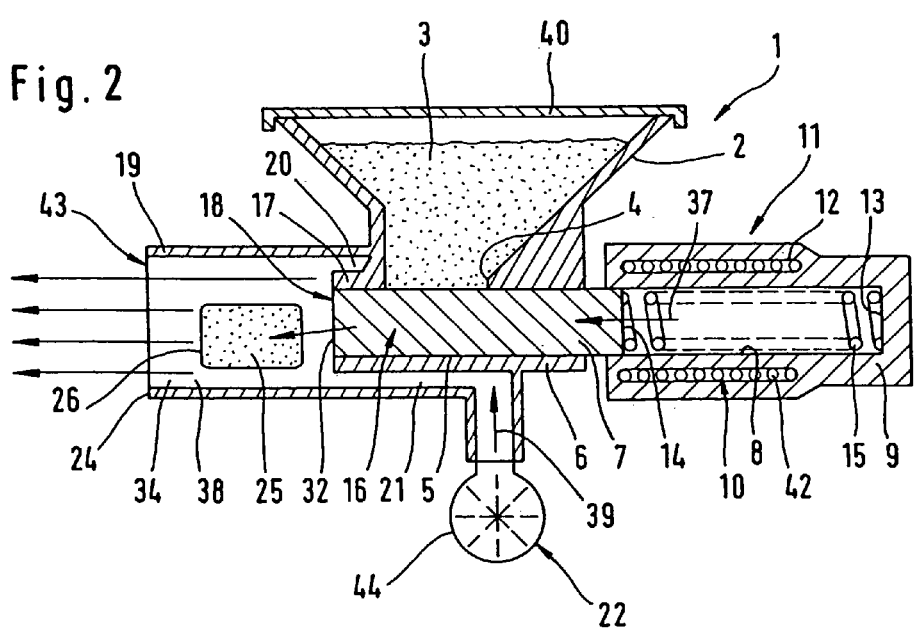
FIG. 2 shows the metering device, according to FIG. 1, after the piston has closed the outlet of the metering chamber and discharged the dosing material from the discharge port, i.e., the initial state of the metering device.

FIGS. 1 and 2 show schematic or basic representations of a metering device 1, such as a beverage dispenser. The metering device 1 consists of a funnel-shaped container 2 that is open on its upper end and can be closed with a cover 40 (FIG. 2). The container serves as a reservoir for powdery, or flaky, or fine-grained dosing material 3. The container 2 can be downwardly tapered, as shown in the figures. An outlet 4 arranged at the narrowest point of the container 2 lies directly above a bore 5 that extends perpendicular to the outlet 4. The bore 5 can have a circular cross section. The bore 5 is arranged in a housing 6, into which the container 2 is also integrated. A reciprocating piston 7 is located in the bore 5 and is also located in another bore 8 of a coil body 10. The coil body 10 is located in another housing 9. The right end 14 of the reciprocating piston 7 can be positioned as shown in the figures. The bores 5 and 8 are aligned with one another such that a smooth movement of the piston 7 is ensured.

The housing 9, the coil body 10, and the piston 7 form the actuating element 11 of the metering device 1. The actuating element 11 and the metering device are stationarily mounted, for example, in a machine for preparing beverages that is not illustrated in the figures. The coil body 10 consists of a copper wire 42 of superior current conductivity that is embedded in a toroidal chamber 12 and, when conducting a current, generates a magnetic field, such that the piston 7 is drawn into the bore 8. The connection to a current is not illustrated in the figures.

A helical pressure spring 15 is situated in the bore 8 of the actuating element 11 between the bottom 13 of the housing 9 and the free end 14 of the piston 7, as shown in the figures. The pressure spring displaces the piston 7 into the bore 5 of the housing 6 of the metering device 1 when the actuating element 11 is not actuated. The helical pressure spring 15 displaces the piston 7 to such a degree that the piston completely closes the outlet 4 (FIG. 2) and extends beyond the outlet as far as the discharge port 18 inside the bore 5. Thus, the valve arrangement 16 is realized in the form of a slideable valve.

An annular extension 17 of the bore 5 is situated adjacent to the housing 6 of the metering device 1. The annular extension 17 is on the left side of bore 5 and in the direction of motion of the piston 7 shown in FIG. 2, wherein a discharge port 18 is formed on the free end of this annular extension. A tube section 19 can be integrated into the housing 6 or formed in one piece therewith. The tube section 19 extends concentrically around the annular extension 17 and extends further toward the left beyond the extension 17. An annular chamber 20 is formed by the area between the tube section 19 and the extension 17 because the outside diameter of the extension 17 is smaller than the inside diameter of the tube section 19. The annular chamber 20 is connected to the fan wheel 44 of a blower 22 that is only schematically indicated in the figures via a flow channel 21. The blower 22 can also be connected by a hose (not shown) to the end of the flow channel 21 that is realized in the form of a pipe socket 23, such that the blower 22 can also be positioned in the device independently of, and at a greater distance from, the metering device 1.

The tube section 19 essentially extends parallel to the piston 7 and to the bore 5. The edge 24 of the tube section 19 defines the outlet 43 for the metered dosing material 25 that is illustrated in the idealized form of a pellet. The sides 26 of the dosing material 25 actually do not form straight surfaces that extend perpendicular to one another.

FIG. 1 schematically shows a brewing chamber 27, into which the dosing material 25 drops in order to be mixed with hot water and brewed. A baffle 28 is provided on the left side of the brewing chamber 27 in order to improve the dropping of the dosing material 25 into the brewing chamber. The top of the brewing chamber 27 is open, and the edge 29 of the filling opening 30 is offset toward the bottom left with reference to the free end 24. Naturally, the brewing chamber 27 illustrated in FIG. 1 is also provided in FIG. 2, in which it was omitted in order to prevent unnecessary repetitions.

The metering device 1 according to the invention functions as described below:

The initial position of the metering device 1 is illustrated in FIG. 2. In the initial position, the piston 7 blocks the outlet 4, such that no dosing material 3 can flow into the metering chamber 31. It should also be noted that the metering chamber 31 extends beyond the region of the bore 5, over which the outlet 4 extends along the bore 5. In the initial position of the metering device 1, the left end 32 of the piston, as show in FIG. 2, is flush with the face 33 of the extension 17, ensuring that the dosing material 25 is discharged in its entirety into the tubular chamber 34 of the tube section 19. The pressure spring 15 defines the closed position of the metering device 1, as shown in FIG. 2, because it is mounted on the bottom 13 of the housing 9 as well as on the free end 14 of the piston 7 and therefore holds the piston 7 in the position shown in its relaxed state.

When a brewing process is initiated, dosing material 3 needs to be transported from the container 2 into the brewing chamber 27. This is achieved by supplying the coil body 10 with a current, such that a magnetic field is generated that draws the piston 7 into the bore 8. As shown in FIG. 1, piston 7 moves toward the right as indicated by the arrow 35 against the force of the spring 15. During this process, the outlet 4 is opened and dosing material 3 is able to drop into the metering chamber 31 until it is completely filled. The blower 22 was already switched on shortly before this time and generates the air current 39 which is directed into the annular chamber 20 via the flow channel 21. The air current flows to the free end 24 of the tube section 19 as indicated with the arrows 36, and then outward. The current supply of the coil body 10 is simultaneously shut off, such that the magnetic field abruptly drops, and the force of the spring 15 causes the piston 7 to move in the direction of the arrow 37, as shown in FIG. 2. The front end 32 of the piston displaces the metered dosing material 25 out of the metering chamber 31 along the bore 5 until the dosing material 25 is discharged from the bore and introduced into the channel 38 formed by tube section 19. At this location, the air current 36 starts to act upon the dosing material 25 such that it is accelerated and transported in the direction of the baffle 28, where the dosing material 25 is deflected downward and introduced into the brewing chamber 27.

The air current 39 at the inlet that is indicated with an arrow can also be pre-heated by means of a not-shown heating device in order to maintain the entire metering device 1 warm and dry and, if applicable, to simultaneously dry slightly moist dosing material 25. Due to these measures, dosing material 25 cannot be deposited on the extension 17 and/or on the tube section 19, and thus cannot clog the metering device 1. The piston 7 is moved back and forth in accordance with the desired number of cups of the respective beverage to be brewed. Piston 7 discharges a predetermined quantity of dosing material 25 that corresponds to the volume of the metering chamber 31 with each piston stroke. Once the brewing process is concluded, the blower 22 can be switched off immediately or after a certain follow-up time that also serves for cleaning and drying the metering device 1.

The housing 6 as well as the container 2 and the tube section 19 can be fabricated in the form of a single injection-moulded plastic part. The piston 7 can also be made of plastic in order to keep the moving masses low.

The brewing chamber 27 that is indicated in FIG. 1 may form part of the mixing device for mixing a powdery, soluble extract as described in patent application PCT/EP03/12026, the contents of which are hereby incorporated by reference as part of this application.

We claim:

1. A beverage brewing device comprising:

a metering device comprising:

a container configured to contain a quantity of dry beverage ingredients;

a bore having a discharge port on one end;

a chamber within the bore sized to contain one metered dose of the ingredients, wherein an outlet of the container opens into the chamber;

an discharge actuator arranged to discharge the metered dose of the ingredients through the discharge port;

a blower arranged to deliver an air current to the metered dose after it is discharged from the discharge port;

a brewing chamber configured to receive the metered dose delivered by the air current; and a channel into which the metered dose is transported after being discharged from the discharge port; wherein the channel surrounds the discharge port and the air current is introduced into the channel through one or more openings arranged between the discharge port and the channel wall.

2. The device of claim 1, further comprising an electrically controlled coil surrounding the actuator on its actuating end configured to axially displace the actuator away from the discharge port and the outlet in the actuated state.

3. The device according to claim 1, wherein individual jet pipes disposed radially in the area between the discharge port and the channel wall deliver the air current into the channel such that the flow direction is parallel to the channel.

4. The device according to claim 1, wherein the actuator is sized to fit and slide within the bore and configured to occlude the outlet in a resting state.

5. The device according to claim 4, wherein the actuator when in an actuated state is axially displaced to allow the metered dose of the ingredients to enter the chamber through the outlet, and wherein the metered dose is pushed out of the discharge port and the outlet is again occluded as the actuator returns to the resting state.

6. The device according to claim 4, wherein the actuator comprises a piston that can be axially displaced in the bore.

7. The device according to claim 6 further comprising an electrically controlled coil surrounding the piston on its actuating side such that the piston closes the outlet in its initial position and can be displaced by the coil against the force of a spring in order to reach its open position.

8. The device according to claim 1, wherein the blower is activated only during the time just prior to the beverage ingredient being discharged from the discharge port until the beverage has been brewed.

9. The device of claim 1, further comprising an electrically driven fan wheel generating the air current.

10. The device according to claim 1, wherein the dry beverage ingredients comprise milk powder.

11. The device according to claim 1, wherein the dry beverage ingredients comprise cocoa powder.

12. The device according to claim 1, wherein the dry beverage ingredients comprise coffee powder.

* * * * *